US009796093B2

United States Patent
Mascorro Medina et al.

(10) Patent No.: US 9,796,093 B2
(45) Date of Patent: Oct. 24, 2017

(54) CUSTOMER SERVICE ROBOT AND RELATED SYSTEMS AND METHODS

(71) Applicant: FELLOW, INC., San Jose, CA (US)

(72) Inventors: Marco O Mascorro Medina, Woodside, CA (US); Zhengqin Fan, Santa Clara, CA (US); Thavidu Ranatunga, San Francisco, CA (US); Daniel T. Barry, South Hadley, MA (US); Utkarsh Sinha, San Jose, CA (US); Sivapriya Kaza, Menlo Park, CA (US); Varun Krishna, Saratoga, CA (US)

(73) Assignee: FELLOW, INC., San Jose, CA (US)

( * ) Notice: Subject to any disclaimer, the term of this patent is extended or adjusted under 35 U.S.C. 154(b) by 115 days.

(21) Appl. No.: 14/921,899

(22) Filed: Oct. 23, 2015

(65) Prior Publication Data
US 2016/0114488 A1  Apr. 28, 2016

Related U.S. Application Data

(60) Provisional application No. 62/068,474, filed on Oct. 24, 2014.

(51) Int. Cl.
*B25J 9/16* (2006.01)
*B25J 11/00* (2006.01)
*G06Q 30/00* (2012.01)

(52) U.S. Cl.
CPC ........... *B25J 9/1697* (2013.01); *B25J 11/008* (2013.01); *G06Q 30/016* (2013.01); *Y10S 901/01* (2013.01); *Y10S 901/47* (2013.01)

(58) Field of Classification Search
CPC ...... B25J 9/1694; B25J 9/1697; B25J 9/0003; B25J 11/0005; B25J 11/001;
(Continued)

(56) References Cited

U.S. PATENT DOCUMENTS 4,354,252 A   10/1982  Lamb et al. .................. 340/502
4,638,445 A    1/1987  Mattaboni ....................... 701/23
(Continued)

OTHER PUBLICATIONS

Official Action issued in co-pending related U.S. Appl. No. 13/586,732, dated Mar. 24, 2016 (32 pages).
(Continued)

*Primary Examiner* — Spencer D Patton
(74) *Attorney, Agent, or Firm* — Hayes Soloway P.C.

(57) ABSTRACT

A robot for providing customer service within a facility includes a locomotion platform, an upper sensor for detecting objects within an upper field of view of the robot, a lower sensor for detecting objects within a lower field of view of the robot, a display and a robot computer in communication with the locomotion platform, the upper sensor and the lower sensor. The robot computer is configured to detect the presence of a customer within the facility based on information received from at least one of the upper sensor and lower sensor, and the robot computer is further configured to access one or more databases storing information associated with products available to customers within the facility and to provide customer service to the customer based on the accessed information.

24 Claims, 6 Drawing Sheets

(58) Field of Classification Search
CPC ..... B25J 11/0015; B25J 11/008; B25J 11/009; B25J 11/0045; Y10S 901/01; G06Q 30/0241; G06N 3/006; G06N 3/008; G05D 2201/0206; G05D 2201/0211
See application file for complete search history.

(56) References Cited

U.S. PATENT DOCUMENTS

| | | | | |
|---|---|---|---|---|
| 4,890,241 | A | 12/1989 | Hoffman et al. | 700/255 |
| 4,939,728 | A | 7/1990 | Markkula et al. | 370/419 |
| 5,293,639 | A | 3/1994 | Wilson et al. | 455/17 |
| 6,292,713 | B1 | 9/2001 | Jouppi et al. | 700/245 |
| 6,347,261 | B1 | 2/2002 | Sakaue et al. | 700/245 |
| 7,461,156 | B2 | 12/2008 | Haupt et al. | 709/228 |
| 7,609,686 | B1 | 10/2009 | McNamara et al. | 370/356 |
| 7,702,739 | B1 | 4/2010 | Cheng et al. | 709/207 |
| 7,801,959 | B1 | 9/2010 | Lennie et al. | 709/206 |
| 7,827,459 | B1 | 11/2010 | Zhou et al. | 714/749 |
| 8,046,744 | B1 | 10/2011 | Marshall et al. | 717/128 |
| 8,050,684 | B2 | 11/2011 | Lewis et al. | 455/445 |
| 8,407,306 | B1 | 3/2013 | Nerieri et al. | 709/206 |
| 8,619,799 | B1 | 12/2013 | Thodupunoori et al. | 370/401 |
| 8,700,722 | B1 | 4/2014 | Sharma et al. | 709/206 |
| 8,965,762 | B2 | 2/2015 | Song et al. | 704/236 |
| 9,191,619 | B2 | 11/2015 | Liu | |
| 2002/0071427 | A1 | 6/2002 | Schneider et al. | 370/352 |
| 2002/0160805 | A1 | 10/2002 | Laitinen et al. | 455/550 |
| 2002/0165790 | A1* | 11/2002 | Bancroft | G06Q 10/063 705/7.29 |
| 2004/0164696 | A1 | 8/2004 | Yourlo et al. | 318/568.11 |
| 2006/0047665 | A1 | 3/2006 | Neil | 707/10 |
| 2006/0071929 | A1 | 4/2006 | Stinis et al. | 345/213 |
| 2006/0105792 | A1 | 5/2006 | Armbruster et al. | 455/517 |
| 2006/0106471 | A1 | 5/2006 | Ikeda et al. | 700/83 |
| 2006/0178559 | A1 | 8/2006 | Kumar et al. | 600/109 |
| 2006/0190526 | A1 | 8/2006 | Neil et al. | 709/203 |
| 2006/0258287 | A1 | 11/2006 | Bidet et al. | 455/41.2 |
| 2007/0069014 | A1 | 3/2007 | Heckel et al. | 235/383 |
| 2007/0100951 | A1 | 5/2007 | Bae | 709/206 |
| 2007/0123307 | A1 | 5/2007 | Adams et al. | 455/566 |
| 2007/0130255 | A1 | 6/2007 | Wolovitz et al. | 709/204 |
| 2007/0156817 | A1 | 7/2007 | Daffner et al. | 709/206 |
| 2007/0162582 | A1 | 7/2007 | Belali et al. | 709/223 |
| 2007/0299918 | A1 | 12/2007 | Roberts | 709/206 |
| 2008/0080370 | A1 | 4/2008 | Willey | 370/229 |
| 2008/0109519 | A1 | 5/2008 | Aaltonen et al. | 709/206 |
| 2008/0140789 | A1 | 6/2008 | Mulligan et al. | 709/206 |
| 2008/0244040 | A1 | 10/2008 | Bhatia et al. | 709/219 |
| 2008/0305775 | A1 | 12/2008 | Aaltonen et al. | 455/412.1 |
| 2009/0047929 | A1 | 2/2009 | Chesnutt et al. | 455/411 |
| 2009/0055019 | A1 | 2/2009 | Stiehl | 700/249 |
| 2009/0163244 | A1 | 6/2009 | Parkkinen et al. | 455/558 |
| 2009/0209250 | A1 | 8/2009 | Huq | 455/425 |
| 2009/0281880 | A1 | 11/2009 | Lee | 705/11 |
| 2010/0070588 | A1 | 3/2010 | Sinn et al. | 709/206 |
| 2010/0094461 | A1 | 4/2010 | Roth et al. | 700/251 |
| 2010/0094985 | A1 | 4/2010 | Abu-Samaha et al. | 709/223 |
| 2010/0131103 | A1 | 5/2010 | Herzog et al. | 700/259 |
| 2010/0150171 | A1 | 6/2010 | Rodbro et al. | 370/468 |
| 2010/0238262 | A1 | 9/2010 | Kurtz | 345/14.01 |
| 2010/0245532 | A1 | 9/2010 | Kurtz | 348/14.03 |
| 2010/0314226 | A1 | 12/2010 | Patel et al. | 200/237 |
| 2011/0071676 | A1 | 3/2011 | Sanders et al. | 700/250 |
| 2011/0087571 | A1 | 4/2011 | Sagi et al. | 705/34 |
| 2011/0125856 | A1 | 5/2011 | Chu et al. | 709/206 |
| 2011/0158476 | A1 | 6/2011 | Fahn et al. | 382/103 |
| 2011/0173621 | A1 | 7/2011 | Meijer et al. | 718/102 |
| 2011/0213657 | A1 | 9/2011 | O'Malley et al. | 705/14.49 |
| 2011/0225578 | A1 | 9/2011 | Lauwers et al. | 717/176 |
| 2011/0231050 | A1 | 9/2011 | Goulding | 701/26 |
| 2011/0238211 | A1 | 9/2011 | Shirado et al. | 700/246 |
| 2011/0288684 | A1* | 11/2011 | Farlow | B25J 11/009 700/264 |
| 2011/0307403 | A1 | 12/2011 | Rostampour et al. | 705/325 |
| 2012/0033605 | A1 | 2/2012 | Yang et al. | 370/312 |
| 2012/0042028 | A1 | 2/2012 | Langoulant et al. | 709/206 |
| 2012/0069131 | A1 | 3/2012 | Abelow | 348/14.01 |
| 2012/0122425 | A1 | 5/2012 | Adams et al. | 455/412.1 |
| 2012/0185547 | A1 | 7/2012 | Hugg et al. | 709/206 |
| 2012/0239196 | A1 | 9/2012 | Olivier | 700/259 |
| 2012/0284397 | A1 | 11/2012 | Cheng | 709/224 |
| 2012/0303774 | A1 | 11/2012 | Wilson et al. | 709/223 |
| 2012/0311046 | A1 | 12/2012 | Grigoriev | 709/206 |
| 2012/0315879 | A1 | 12/2012 | Vrbaski et al. | 455/412.1 |
| 2013/0007299 | A1 | 1/2013 | German et al. | 709/237 |
| 2013/0047034 | A1 | 2/2013 | Salomon et al. | 714/18 |
| 2013/0050743 | A1 | 2/2013 | Steely et al. | 358/1.15 |
| 2013/0111572 | A1 | 5/2013 | Gaddam et al. | 726/7 |
| 2013/0120547 | A1 | 5/2013 | Linnell | 348/61 |
| 2013/0173727 | A1 | 7/2013 | Libin et al. | 709/206 |
| 2013/0179514 | A1 | 7/2013 | Arora et al. | 709/206 |
| 2013/0212203 | A1 | 8/2013 | Park et al. | 709/206 |
| 2013/0231779 | A1 | 9/2013 | Purkayastha et al. | 700/259 |
| 2014/0009561 | A1* | 1/2014 | Sutherland | B25J 5/007 348/14.05 |
| 2014/0095216 | A1 | 4/2014 | Radhakrishnan | 705/5 |
| 2014/0184423 | A1 | 7/2014 | Mensinger et al. | 340/870.09 |
| 2014/0270115 | A1 | 9/2014 | Burnett et al. | 379/88.12 |
| 2014/0304238 | A1 | 10/2014 | Halla-Aho et al. | 707/692 |
| 2015/0246654 | A1 | 9/2015 | Tadic | 340/436 |

OTHER PUBLICATIONS

Official Action issued in co-pending related U.S. Appl. No. 13/586,732, dated Oct. 24, 2014 (20 pages).
Advisory Action issued in co-pending related U.S. Appl. No. 13/586,732, dated Dec. 23, 2015 (4 pages).
Office Action issued in U.S. Appl. No. 13/586,732, dated Sep. 2, 2016 (39 pgs).
Broccia et al., "Gestural Interaction for Robot Motion Control," Eurographics Italian Chapter Conference, 2011, (8 pgs).
Notice of Allowance issued in U.S. Appl. No. 13/586,732, dated. Dec. 8, 2016 (22 pgs).
Yim, Ji-Young and Chris Saw, "Design Consideration of Expressive Bidirectional Telepresence Robots", May 7-12, 2011 CHI 2011, pp. 781-790.
Campbell et al., "The Message Session Relay Protocol (MSRP)", RFC 4975, 2007 (64 pgs).
Campbell et al., "The Message Session Relay Protocol", 2005 (58 pgs).
Libin et al., U.S. Appl. No. 61/580,907, filed Dec. 28, 2011 (4 pgs).
Lixia Zhang, *VirtualClock:A New Traffic Control Algorithm for Packet Switching Networks*, ACM SIGCOMM Computer Communication Review, 1990, pp. 19-29.
Notice of Allowance issued in U.S. Appl. No. 13/896,162, dated Jul. 31, 2015 (33 pgs).
Office Action issued in U.S. Appl. No. 13/586,732, dated Jun. 6, 2014 (24 pgs).
Office Action issued in U.S. Appl. No. 13/586,732, dated Mar. 20, 2015 (26 pgs).
Office Action issued in U.S. Appl. No. 13/586,732, dated Sep. 30, 2015 (23 pgs).
Office Action issued in U.S. Appl. No. 13/896,162, dated Jan. 22, 2015 (22 pgs).
International Search Report and Written Opinion issued in application No. PCT/US15/57392, dated Jan. 12, 2016 (10 pgs).
International Preliminary Report on Patentability issued in application No. PCT/US2015/057392, dated May 4, 2017 (8 pgs).

* cited by examiner

CUSTOMER SERVICE ROBOT AND RELATED SYSTEMS AND METHODS

CROSS REFERENCE TO RELATED APPLICATION

This application claims benefit of U.S. Provisional Application Ser. No. 62/068,474 entitled, "Customer Service Robot and System" filed Oct. 24, 2014, the entire disclosure of which is incorporated herein by reference.

FIELD OF THE DISCLOSURE

The present disclosure is generally related to robotic devices and is more particularly related to customer service robots and related systems and methods thereof.

BACKGROUND

Creating high quality in-person customer service is not an easy task, as past efforts to improve customer service demonstrate. The customer experience in most retail stores has largely been in the same condition for decades. When customers need to ask something, even just a simple product location question, they typically have to walk around the store to track down a store representative, who may be assisting another customer, and the customer thus must sometimes wait for assistance. Further, it is not uncommon that such a representative cannot provide the desired assistance, as it would be nearly impossible to memorize and keep track of what can sometimes be tens of thousands or more different items in the store. In part due to the prevalence of online or e-commerce shopping, today's customers expect to have everything at their fingertips, instantly available to them, and the current state of the shopping experience in physical locations fails to meet these expectations. Physical stores are also scattered everywhere in a disconnected manner, and while when combined, they likely have more manpower than e-commerce competitors, they are not united and sorely under-utilized at different times of the day. There are many types of known service robots; however, such robots are not well-suited for retail or customer service purposes, and thus are generally inefficient, unproductive, unattractive and otherwise less than desirable.

Thus, a heretofore unaddressed need exists in the industry to address the aforementioned deficiencies and inadequacies.

SUMMARY OF THE DISCLOSURE

Embodiments of the present disclosure provide robots and robotic systems for providing customer service within a facility. In one embodiment, a robot for providing customer service within a facility is provided. The robot includes a locomotion platform, an upper sensor for detecting objects within an upper field of view of the robot, a lower sensor for detecting objects within a lower field of view of the robot, a display and a robot computer. The robot computer communicates with the locomotion platform, the upper sensor and the lower sensor, and the robot computer includes a processor and computer-readable memory. The robot computer is configured to detect the presence of a customer within the facility based on information received from at least one of the upper sensor and lower sensor, and to access one or more databases storing information associated with products available to customers within the facility and provide customer service to the customer based on the accessed information.

In another embodiment, a robotic system for providing customer service within a facility is provided that includes a robot and a support station. The robot includes a locomotion platform, an upper sensor for detecting objects within an upper field of view of the robot, a lower sensor for detecting objects within a lower field of view of the robot, a display, and a robot computer in communication with the locomotion platform, the upper sensor and the lower sensor. The robot computer includes a processor and computer-readable memory. The support station is located remote to the robot, and includes a support station camera, a support station display, and a support station computer in communication with the support station camera and support station display. The support station computer includes a processor and computer-readable memory. The robot is configured to provide customer service by facilitating a two-way communication between a customer interacting with the robot in the facility and an operator at the remotely-located support station.

An object of the invention is to provide improved customer service through targeted advertising and route selection.

Another object of the invention is to provide mapping, inventory integration, product location, and customer guiding services.

Yet another object of the invention is to provide improved customer engagement within a facility.

Yet another object of the invention is to provide improved inventory control.

Yet another object of the invention is to provide trade market monitoring.

And another object of the invention is to provide improved customer service through communications with support operators.

In another embodiment, the present disclosure can also be viewed as providing methods of providing customer service with a robot. In this regard, one embodiment of such a method, among others, can be broadly summarized by the following steps: providing a robot within a facility with at least one customer, wherein the robot has a locomotion platform, an upper sensor for detecting objects within an upper field of view of the robot, a lower sensor for detecting objects within a lower field of view of the robot, a display, and a robot computer in communication with the locomotion platform, the upper sensor and the lower sensor; detecting a presence of the at least one customer within the facility based on information received from at least one of the upper sensor and lower sensor; and providing customer service to the at least one customer.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

In the following description, reference is made to the accompanying drawings, which form a part hereof, and in which is shown, by way of illustration, various embodiments of the present disclosure. It is understood that other embodiments may be utilized and changes may be made without departing from the scope of the present disclosure.

Many aspects of the invention may take the form of computer-executable instructions, including algorithms executed by a programmable computer. Those skilled in the relevant art will appreciate that the invention can be practiced with other computer system configurations as well. Certain aspects of the invention can be embodied in a special-purpose computer or data processor that is specifically programmed, configured or constructed to perform one or more of the computer-executable algorithms described below. Accordingly, the term "computer" as generally used herein refers to any data processor and includes Internet appliances, hand-held devices (including palm-top computers, wearable computers, cellular or mobile phones, multi-processor systems, processor-based or programmable consumer electronics, network computers, minicomputers) and the like.

Some aspects of the invention may also be practiced in distributed computing environments, where tasks or modules are performed by remote processing devices that are linked through a communications network. In a distributed computing environment, program modules or subroutines may be located in both local and remote memory storage devices. Aspects of the invention described below may be stored or distributed on computer-readable media, including magnetic and optically readable and removable computer disks, fixed magnetic disks, floppy disk drive, optical disk drive, magneto-optical disk drive, magnetic tape, hard-disk drive (HDD), solid state drive (SSD), compact flash or non-volatile memory, as well as distributed electronically over networks. Data structures and transmissions of data particular to aspects of the invention are also encompassed within the scope of the invention.

Figure 1:
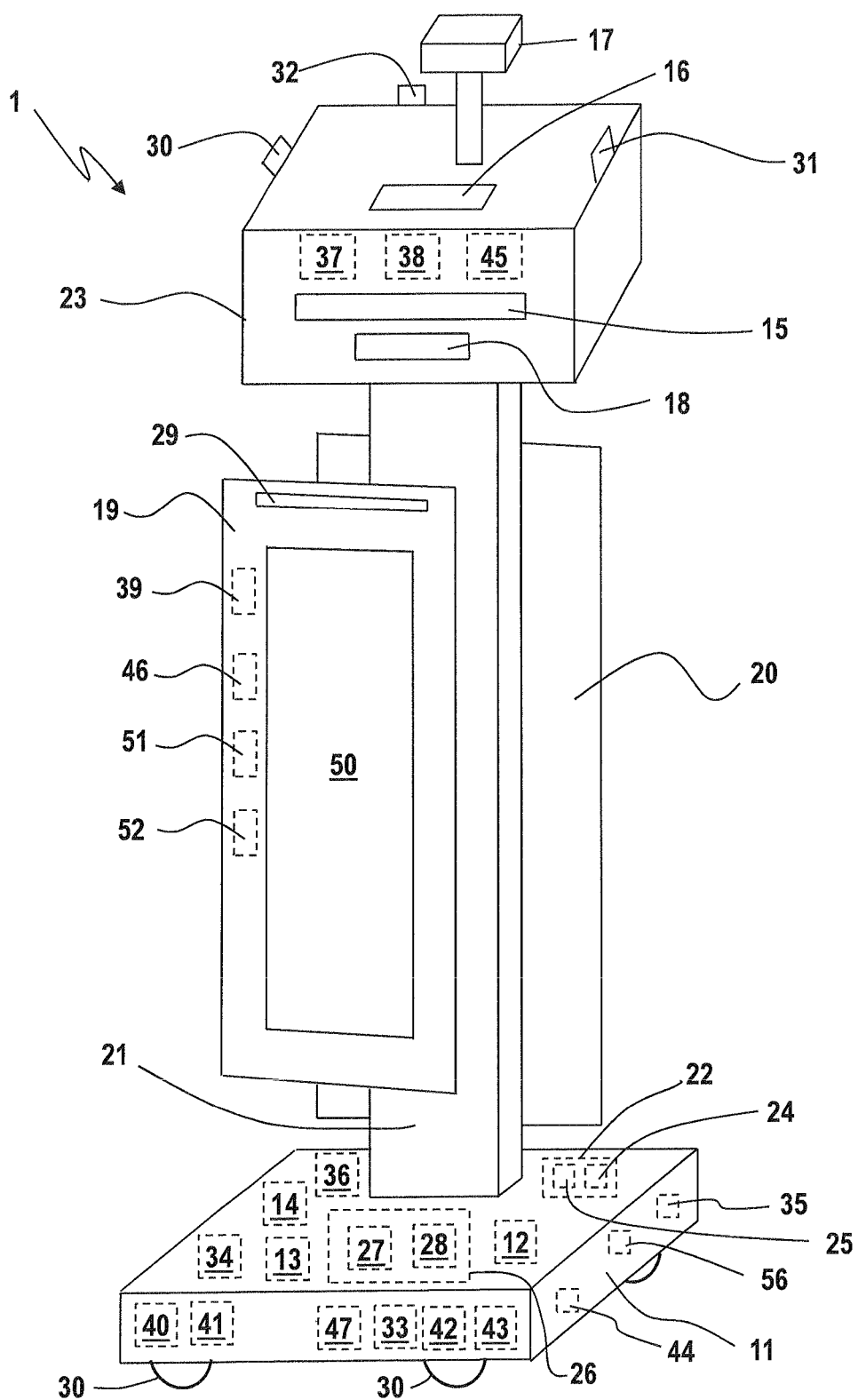
FIG. 1 is a schematic illustration of a robotic device for providing customer service within a facility, in accordance with a first exemplary embodiment of the disclosure.

FIG. 1 is a schematic illustration of a robotic device 1 for providing customer service within a facility, in accordance with a first exemplary embodiment of the disclosure. The robotic device 1 for providing customer service, which may be referred to herein as a customer service robot 1, may be any type of robot, telebot, or similar fully or partially robotic device which is capable of autonomously navigating, sensing or detecting some element and communicating with a remotely located support station. The customer service robot 1 may include a locomotion platform 11, a robot head 23, a wireless communication device 13, a robot computer 14, a lower 3D sensor 12, an upper 3D sensor 15, a multi-array microphone 16, a speaker 18, a touch-screen device 19, and a back display 20. Further, the customer service robot 1 may include a structure 21 such as a frame which connects the mobile platform 11 to the robot head 23. While described in the exemplary embodiments herein as being "3D" sensors, those skilled in the relevant field will readily appreciate that either or both of the upper sensor 15 and lower sensor 12 may be 2D sensors, and embodiments of the robot having 2D sensors as either or both of the upper sensor 15 and lower sensor 12 are considered to be within the scope of the present disclosure.

The locomotion platform 11 allows the robot 1 to move. The locomotion platform 11 may have, for example, two or more wheels and casters 30, allowing the robot to move in any direction. The robot 1 may include any type of drive system to move using the locomotion platform 11, such as electromechanical drive motors. The robot 1 may have a variety of heights but will preferably be at least five feet tall in order to produce an optimal convenience for the customers. The height of the structure 21 may be adjustable and robot head 23 may be able to pan and tilt, or otherwise move, thereby allowing the height of the robot 1 and the angle of the robot head 23 to change in order to provide any desired height and view from the upper sensor 15.

The robot computer 14 can be any computing device constructed from various hardware and software components utilizing any known operating system. In one embodiment, the robot computer 14 is a mini computer that uses Ubuntu operating system and includes a single 12V power supply. The robot computer 14 may have sufficient processing power to run a variety of software, including for example, Robot Operating System (ROS), video processing with OpenCV, and the like. Any computing components known in the art may be used with the robot computer 14.

Multiple sensors may be provided on the customer service robot 1. The sensors may include any type of sensor, including three-dimensional (3D) sensors, two-dimensional (2D) sensors, or any other sensor known in the art. Since 3D sensors may be preferable for most uses, this disclosure describes the sensors as being 3D sensors. An upper 3D sensor 15 allows the robot 1 to perceive people and objects in front of the robot 1, and additional upper sensors 30, 31, 32 (which may be 2D, 3D or otherwise) allow the robot 1 to perceive people and objects that are on the sides and in the back of the robot 1, respectively. A lower 3D sensor 12 on the locomotion platform allows the robot 1 to detect obstacles on the ground in front of the robot, and additional lower sensors 34, 35, 36 (which may be 2D, 3D or otherwise) allow the robot 1 to detect obstacles on the ground, on the sides and in the back of the robot 1. The robot 1 may further include a panorama 3D sensor 17, which enables the robot 1 to detect objects located at any angle to the robot 1. The 3D sensors 12, 15, 17, 30, 31, 32, 34, 35, 36 may be any kind of 2D or 3D video cameras, laser rangefinders, 2D or 3D scanners, structured light scanners, stereo cameras, ultrasound, radar, lidar or any other sensing or scanning devices for detecting 2D or 3D static and/or dynamic movements. In one embodiment, the upper sensors are Microsoft Kinect devices; the lower sensors are Hokuyo Lidar devices; and the panorama 3D sensor is a Velodyne Lidar device.

The robot 1 may include a touch-screen device 19 having a touch-screen display 50, a computer 51, and an eye tracking device 29. The touch-screen display 50 may include any type of interactive GUI which presents information to a customer and allows the customer to interact with the touch-screen display 50. The computer 51 includes sufficient processing power to run a variety of touch-compatible software, including for example Windows 8 Operating System. The back display 20 may be connected to the touch-screen device computer 51, and may include a touch-screen feature, similar to the touch-screen device 19. The use of the touch-screen device 19 and the back display 20 allows the robot 1 to be interactive with customers from multiple directions. For example, a first customer may use the touch-screen device 19 on the front of the robot 1 to interact with the robot 1 while a second customer views information displayed on the back display 20.

The multi-array microphone 16 is connected to the touch-screen device computer 51, and can enable the robot 1 to conduct acoustic source location and ambient noise suppression. With microphone 16, the robot 1 is able to understand the speaking of multiple people at the same time, and tell the speaking of a particular person from the ambient noise. One or more speakers 18 are also included on the robot 1, so that the robot 1 can communicate with the customer in speech. The speaker 18 is connected to the computer 51, which will detect the ambient noise through the microphone 16, and determine the correct speaker volume for speaker 18. The speech by which the robot 1 communicates may include any language.

The robot 1 may further include a power system 22. The power system 22 may include a battery 24 and a charging system 25. The battery 24 may be a rechargeable lead-acid battery or any other type of battery. The charging system 25 may include an interface which allows the robot 1 to electrically couple to a docking station (not shown) for charging. The power system 22 may include power distribution circuitry and components, including regulators, heat dissipation devices, fuses and/or circuit breakers. Furthermore, the power system 22 may include an emergency cut-off circuit which may automatically, or manually, cut power from the robot 1 under certain circumstances, for example if the battery is too hot, if the battery is below a certain minimum threshold charge, or if the robot moves outside of a predefined area. Battery life may vary significantly depending on how much the user moves the robot. Preferably, the battery type, size and capacity allows for eight hours of hard use between charges.

The robot 1 may further include an embedded system 26 which has one or more processor(s) 27 and associated circuitry 28 for the control and sensing interface of the robot 1. The processor 27 may be, for example, an Arduino Mega microcontroller, which allows for easy development along with serial output for controlling the platform 11, and may act as a serial (e.g., via USB) device that provides an interface to the robot computer 14. The processor 27 may be any processor, microprocessor or microcontroller, and may be a PIC microcontroller, which is generally powerful and allows for high speed USB and Ethernet connections for data transfer. The processor 27 may include or be associated with some amount of computer-readable memory.

The robot 1 may further include a robot location detector 33. The robot location detector 33 may utilize any of a number of known location detection techniques, including Global Positioning System (GPS), Indoor Positioning System (IPS) and Inertial Navigation System (INS), to detect the location of the robot 1. The robot location detector 33 may also function in coordination with any number of maps, floorplans, or similar schematics of a layout of the facility in which the robot 1 is utilized. The robot 1 may also include at least one RFID antenna 56 which is capable of receiving and transmitting RFID signals to and/or from the robot 1.

Additional sensors may be included on the robot 1. These may include any of: infrared cameras 37 (e.g., for sensing environmental heat sources as well as personal blood flow distribution of a customer); radar sensor or Doppler radar sensor 38 (for movement detection and detection of personal respiration and heart rates of customers); which may be piezoresistive, piezoelectric, capacitive and/or electroresistive sensors which may be sensitive to touch, force and/or pressure; cliff sensor 40 (for sensing the presence of a "cliff" or stairs, or other terrain features); bump sensor 41 which may be a force sensor for sensing when the robot 1 has bumped into an object; humidity sensor 42 which may be a hygrometer for sensing the humidity in the environmental air; chemical sensor 43 which may be a potentiometric sensor for sensing chemical components of an environment; vibration sensor 44 which may be a piezoelectric sensor or accelerometer for sensing vibrations; ultraviolet sensor 45 for sensing ultraviolet radiation; ultrasonic sensor 46 which may be used for detecting people, for detecting the fullness of liquid in a tank (e.g., a fuel tank, etc.), for measuring wind speed and direction, or for any other known uses; and/or a temperature sensor 47 for sensing an environmental temperature and/or for sensing the temperature of the robot computer 14 or any other heat emitting or sensitive component. Each of these additional sensors may communicate with the robot computer 14 and the touch-screen device 19.

Any of the above-described sensors, as well as other sensors and/or sensing technologies including, for example, biometric sensors 52, may be employed to extend the capability of the robot 1 to sense blood flow, respiration and heart rate, retinal patterns, and body fluid distribution of an observed customer. For example, the camera 39 may detect the person's papillary dilation and retinal patterns. The infrared camera 37 or other thermal imaging device may sense the person's blood flow and body fluid distribution. The person's respiration may be sensed by the camera 39, for example, and the person's breathing patterns may be determined based on the visible expansion and contraction of the person's chest, or the movements of the person's nostrils while inhaling and exhaling. And, the person's heart rate may be sensed and determined, for example, based on information sensed by the camera 39, infrared camera 37 or electric potential sensors, as heart rate may be determined based on variations in skin brightness, variations in blood flow and/or displacement current using a capacitive coupling. These parameters are helpful in assessing "state-of-mind" of the observed individual.

Figure 2:
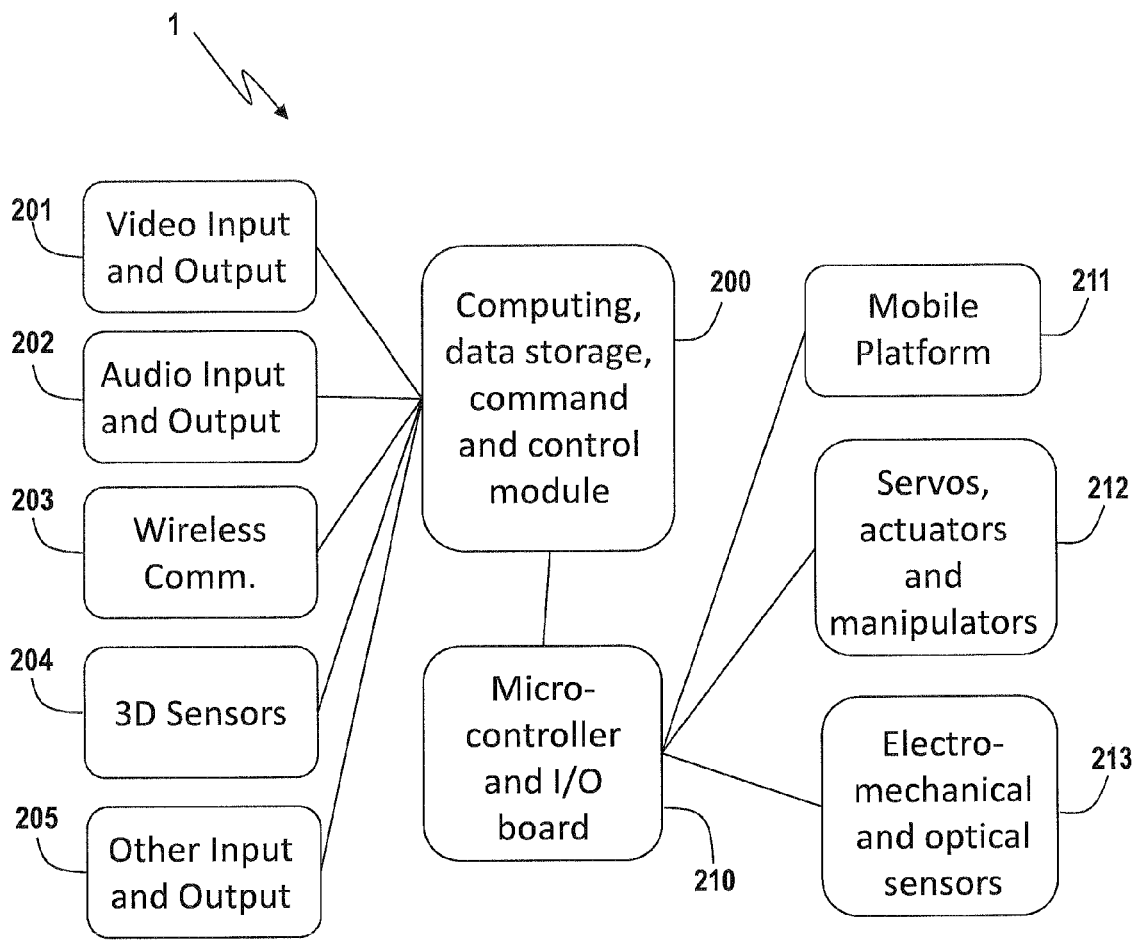
FIG. 2 is a block diagram of subsystems of the robotic device for providing customer service within the facility of FIG. 1, in accordance with the first exemplary embodiment of the disclosure.

FIG. 2 is block diagram of subsystems of the robotic device 1 for providing customer service within a facility of FIG. 1, in accordance with the first exemplary embodiment of the disclosure. Accordingly, each block/module of FIG. 2 represents a subsystem of the robot 1. Video inputs and outputs 201, audio inputs and outputs 202, wireless communications 203, 3D sensors 204, and other input and output 205 subsystems all communicate with computing, data storage, command and control subsystem 200. The subsystem 200 communicates with the microcontroller and I/O board 210, which controls the mobile platform 211, the servos, actuators and manipulators 212, and connects the electromechanical and optical sensors 213. When the various subsystems are used in concert, the robot 1 is capable of providing customer service to customers in a facility and otherwise performing the various functions described herein.

Figure 3:
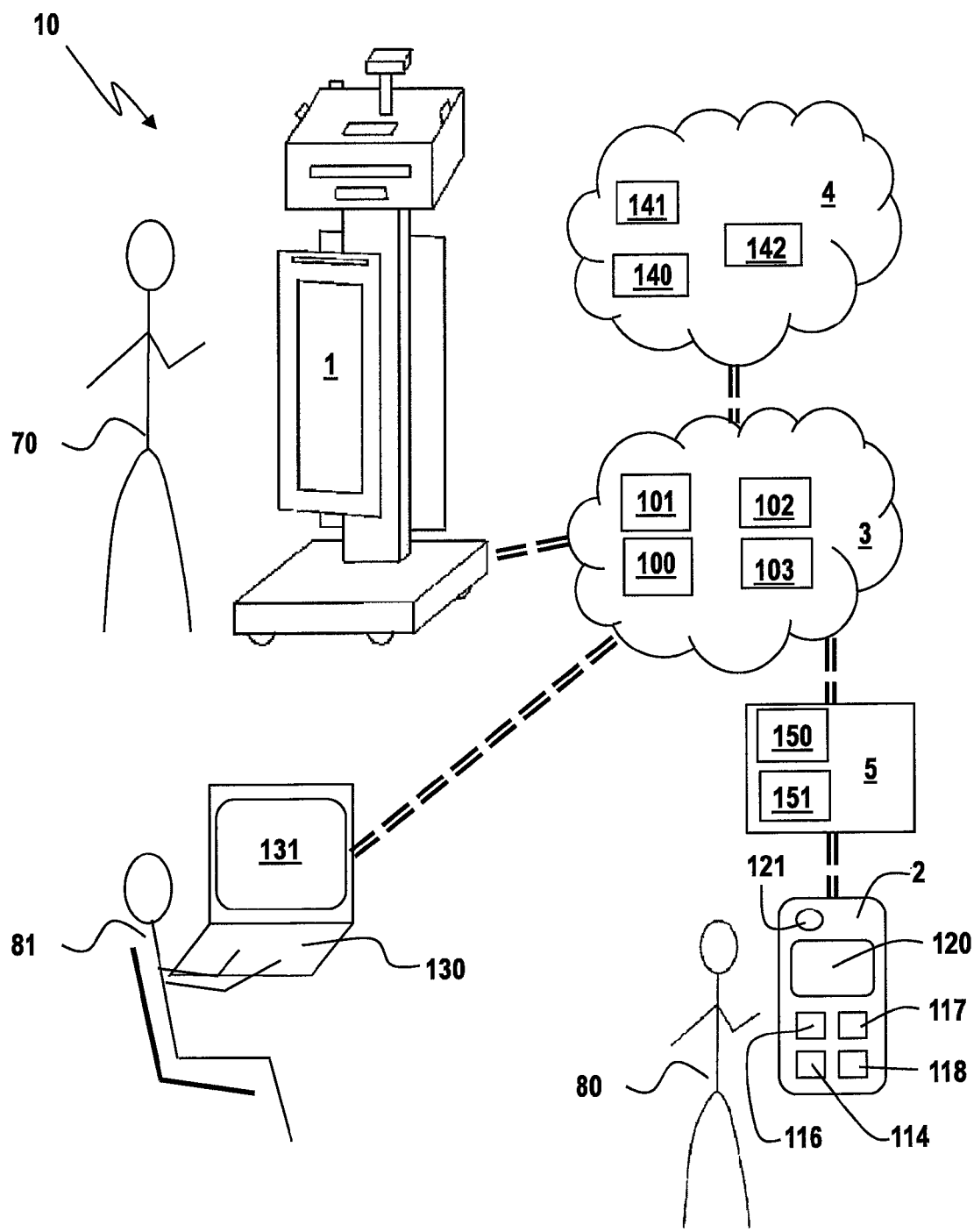
FIG. 3 is a schematic illustration of a robotic system for providing customer service within a facility using the robotic device of FIG. 1, in accordance with the first exemplary embodiment of the disclosure.

FIG. 3 is a schematic illustration of a robotic system 10 for providing customer service within a facility using the robotic device 1 of FIG. 1, in accordance with the first exemplary embodiment of the disclosure. Relative to FIGS. 1 and 3, the robot 1 may be capable of communication with other components of the robotic system 10 to facilitate full functionality. The wireless communication device 13 of the robot 1 may communicate with a computing center 4 through a computer network 3. The network 3 may include any number of network-accessible devices, for example, a first network 101, a server 100, a second network 102, a local wireless communication device 103 (which may be, for example, a local wireless router). The computer networks 101 and 102 may be any wired or wireless computer network that enables communication between devices, including local area networks (LAN), wide area networks (WAN), the Internet, Wireless LAN, Wi-Fi, mobile device networks, IEEE 802.11, GSM, GPRS, UMTS, 3G and 4G communications protocols, or any other network arrangement and/or protocol known to those having ordinary skill in the art.

The computing center 4 may be any kind of cloud computing center, data center, super-computer, and other powerful computing resources. The computing center 4 may include a promotion database 140, which contains various promotion information and materials of products, such as promotion videos, images, product description, promotion priority, promotion benefits, promotion history, brand relationship and other information. The computing center 4 may further include a digital inventory database 141 of a facility, which may contain scanned structural information in three dimensions about the products, and computing center 4 may share this inventory database 141 with robot computer 14, for example, for displaying to the consumer. The computing center 4 may integrate this inventory database 141 into a map of the facility, and thus may identify the location of products on the map, with a precision so high that different products on the same shelf can be sufficiently differentiated for inventory control purposes. The computing center 4 may further include a customer database 142, which contains anonymous information of customers, such as purchase history, loyalty card information, robot interaction history, customer behavior pattern analysis, and so on.

The robot 1 may be capable of communicating with a support station 2 through the computer network 3 and an operator network system 5. The support station 2 may be used to allow an operator 80 to communicate with a customer 70 interacting with the robot 1. The support station may include a camera 121, a support station computer 114, a touch-screen display 120, a microphone 116, a speaker 118, and an input device 117 such as a keyboard, a mouse, or a joystick. The support station 2 is typically located in a place that is remote from the robot 1, such as at a remote customer service center for the facility. While only one robot 1 and one support station 2 are shown, one having ordinary skill in the relevant field will readily understand that the system 10 may include a plurality of robots 1 and/or a plurality of support stations 2.

Video images captured by the camera 121 of the support station 2 may be transmitted to the robot 1 (e.g., over the network 3), where they may be displayed on the touch-screen display 50. Audio signals also may be picked up by the support station microphone 116 and transmitted to the robot 1, where they may be broadcast by the speakers 18. Similarly, video and audio signals may be picked up by the robot 1 and transmitted to the support station 2. Thus, an operator 80 at the support station 2 may view images and hear audio of the remotely located robot's surroundings.

Two-way video communication with an audio link may thus be performed between an operator 80 at the support station 2 and a customer 70 in communication with the robot 1. For example, the camera 39 of the robot 1 may capture video data of a person within the camera's field of view, and the microphone 16 may capture audio information from the person. This information is transmitted to the support station 2, where it may be output to the display 120 and/or speakers 118. At the same time, video and audio information from an operator 80 at the support station 2 may be captured by the camera 121 and the microphone 116, respectively, and transmitted to the robot 1, where it may be output to the display 50 and/or speakers 18. The present invention may utilize two-way video chat protocols that are platform-independent, do not require a public IP address, have no need for special tunneling or firewall configuration, do not require remote information technology assistance, and can be used with both Wi-Fi and 4G connections.

By operating the support station 2, an operator 80 may give a command to the robot 1 to navigate to a certain location, located remote from the support station 2. Commanding of the robot 1 may be accomplished with the touch-screen display 120 or the input device 117 which communicates with the support station computer 114. Commands may be received and interpreted by the computer 114, and transmitted to the robot 1, for example, through the network 101, the server 100, the network 103, wireless communication device 103, the robot computer 14 and then to the locomotion platform 11. The robot 1 will move as desired, in response to the received command.

The system 10 may operate in conjunction with system backend software 131 which can be installed and run on any commercially available computer operating system, including Windows, Mac OS, Linux, Android, iOS, and the like. A facility manager or agent 81 may install and use the software 131 on the computers and mobile devices, such as smartphones and tablets, at the facility. The software may allow the manager or agent 81 to define the order and priorities of the tasks of robot 1, and upload advertising materials, such as promotion videos, images, product description, and the like, to the promotion database 140 of the computing center 4. The software 131 can automatically process the information entered by the manager or agent 81 and convert it into a format that can be understood by the robot 1.

Operational Example:

The robot 1 can autonomously explore a facility, for example, using its panorama, upper and lower 3D sensors. The visual data captured by the 3D sensors, along with corresponding location information, which may be determined by a robot location detector such as GPS, IPS, INS or other such technologies, may be utilized to generate a map of the facility. The map of the facility may be stored in the robot computer 14 or the computer center 4. The robot 1 may use the upper 3D sensors to scan samples brought by customers, and find the matching structural information in the digital inventory with the structural information of the sample, and thus locate the product in the facility. The robot 1 can then provide further service to the customer by displaying information about the product (such as its location within the facility, price, promotional information, etc.) to the customer on the touchscreen device 19 or back display 20, or by guiding the customer to the location of the product within the facility.

The robot 1 can attract customer attention, for example, by making small movements using its locomotion platform 11 or its robot head 23. The robot 1 may also attract customer attention by displaying static or dynamic graphics, which may include an avatar figure, on touchscreen device 19 or back display 20. The robot 1 may further attract customer attention by producing audio signals through the speaker 18. The robot 1 can further detect the interest of a customer 70 towards itself by monitoring the customer's communication response rate, head rotation, facial expression pattern, or otherwise sensing various parameters to determine the customer's "state-of-mind" as discussed previously herein. When the interest is low, the robot will skip this customer, and navigate back to its home position in the facility. The home position of robot 1 can be the location of a charging station or any other location in the facility, pre-determined by a facility manager or agent. On the way back to its home position, the robot 1 can choose a route that may have more customer density based on captured data, and it will look for other customers that need service, using its upper 3D sensor. The robot 1 can determine a customer's need for service by analyzing customers' facial expression, walking pattern, head rotation, vision direction, etc. If the robot 1 finds a customer that may need assistance, it will approach the customer and use speech and graphical information to inquire if the customer needs help. Once an interaction begins between the robot 1 and a customer, the robot 1 can also detect whether a customer stays engaged with itself. When the robot 1 finds the customer no longer engaged in the interaction, it will terminate the current task and resume the task of returning to its home position.

The computing center 4 and the computer 14 may each run speech engine software which may use multiple language packages. The speech engine software may be or include any known speech engine, speech-to-text or other such technologies, as will be readily appreciated by those having skill in the relevant field. The speech engine software enables the robot 1 to engage with a customer in natural speech conversation in multiple languages. Through the speech conversation, the robot 1 will receive spoken information through microphone 16. Using known information processing technologies, the spoken information will be processed by computer 14 and computing center 4, in order to extract critical information and understand the need of the customer, such as purchase interest, product information, location inquiries, advice request, and perform other customer service actions.

The customer 70 can communicate with the robot 1 about his/her need by speech or by operating the touch-screen device 19, and if the facility does not carry the product that the customer needs, the robot 1 can provide certain alternative solutions to the customer. For example, if a customer wants to buy cereal in a retail store, the robot 1 can provide all the options of cereal products along with milk promotions on the touch-screen device 19, by accessing the product inventory stored in the computing center 4, as people who buy cereal are likely to buy milk as well. Meanwhile, the robot 1 offers to guide the customer 70 to the cereal section, for example, by saying "May I guide you to the cereal section in aisle #10?" If the customer 70 would like to accept the service, he/she can confirm (e.g., by saying "Yes, please"), and the robot 1 will guide the customer 70 to that location of the store. If the store has run out of the cereal product the customer 70 wants, the robot 1 can offer to order the cereal online and ship it to the customer's address (which may be stored, for example, in the computing center 4).

The robot 1 can provide information and recommendations associated with the customer's needs on the touchscreen device 19, and may further offer to guide the customer 70 to the section of the facility that may fulfill the need. If the customer 70 accepts the guidance, the robot 1 will find a path on the indoor map that connects the current location to the desired section. There can be multiple path options from the current location to the desired section of the facility. As such, the robot 1 may utilize a path optimization algorithm to determine which of multiple path options to choose. For example, the robot may select an optimal path based on considerations such as showing products under promotion and reaching the destination efficiently. The robot 1 can 'know' which products are of high promotion priority by accessing the promotion database 140.

The robot 1 is designed to work with and alongside customers and other people in a friendly and intuitive manner. While navigating through the very dynamic environment that exists in an indoor facility or other commercial location, further described with respect to FIG. 4, the robot 1 is also capable of speaking and engaging with people dynamically. For example, rather than staying still at a home location and waiting for an interaction, the robot 1 may wander around the facility attempting to ask random customers if they need help with anything. It will not ask customers repeatedly, but only some percentage of the time, in order not to be annoying. It will detect customer's faces as they approach in order to know when they are present. The robot 1 may express itself by voice, but also by motion and the colors of mood lights, which may include a variety of light-emitting diodes (LEDs) positioned on the robot 1. The robot 1 will move slower in busy/crowded sections and it will change its LED colors to represent various states of its being, e.g., crowded, lost, helping someone, engaging, patrolling normally, or others. In addition to audible and LED-based communication, the robot 1 may perform a wiggle motion using just its base when greeting a new customer, getting their attention, and/or attempting to engage them.

When navigating or guiding a customer through an indoor facility, the robot 1 may express both its status and its awareness of the environment, in order to seem relatable to the customer. To this end, when the robot 1 is waiting for a person who is in its way, or going by a person who is close, the robot will say some polite phases such as "Excuse me", when the robot's sensors won't allow it to navigate very freely due to many people being around, the robot will alert the customer(s) which it is guiding that it is feeling crowded, and when the robot 1 can't move, it will apologize sincerely and say that it is stuck. When the robot 1 is nearby the target location, and there is an obstacle blocking its route, rather than re-routing to a very long path around the retail space, the robot 1 will inform the customer, operator, or other individual that the item is up ahead.

Figure 4:
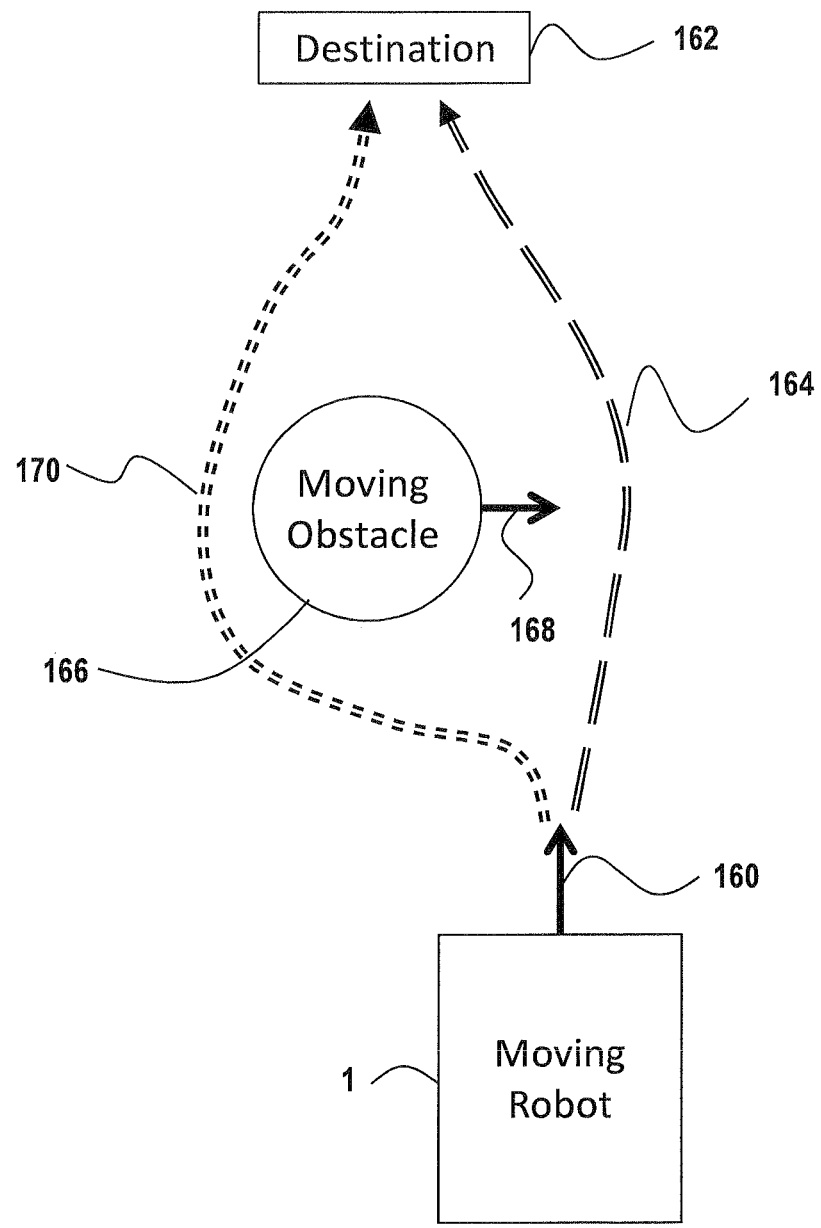
FIG. 4 is a schematic illustration of active path planning used by the robotic device of FIG. 1, in accordance with the first exemplary embodiment of the disclosure.

FIG. 4 is a schematic illustration of active path planning used by the robotic device 1 of FIG. 1, in accordance with the first exemplary embodiment of the disclosure. Finding a path within the facility for a customer may often be a simple mapping process when the facility is largely unoccupied. However, many facilities may have many objects moving around within the building which creates a dynamic environment in which the robot 1 must operate. For example, in an indoor commercial environment, there are lots of moving objects, ranging from humans, to shopping carts, to moving pallets, that the robot must navigate through. In these dynamic environments, the robot 1 may utilize active path planning which takes into account moving obstacles when devising a path.

Consider an example where a customer may walk in front of a moving robot 1. As shown in FIG. 4, the robot 1 may be moving in a first direction 160 towards a destination 162 along a typical path 164, e.g., a path determined prior to the detection that an obstacle 166 is moving. This typical path 164 may be constructed from a typical path planning algorithm that simply devises a path towards the right of the obstacle 166 because at the time of planning, the obstacle 166 was to the left of the robot 1. However, when the obstacle 166 begins to move in direction 168, the robot 1 must take into account that the obstacle 166 is moving towards the right side of the robot 1, and therefore, moving to a position that will intercept with the typical path 164 and cause a collision between the robot 1 and the obstacle 166.

To prevent collisions between the robot 1 and the moving obstacle 166, the robot 1 may create a second or active path 170 which navigates around the obstacle 166 in a manner which is depending on the movement of the obstacle 166. For example, the robot 1 detects the moving obstacle 166, which may include any object (e.g., humans, carts, etc.) and track the movement of the moving obstacle 166. Based on the movement of the moving obstacle 166, the robot 1 determines the best path to navigate through the moving obstacle 166 or around the moving obstacle 166. In the illustration of FIG. 4, the active path 170 may be around the rear of the moving obstacle 166. The robot may respond quickly to obstacles suddenly appearing in its field of view by actively braking the robot 1. This active braking may include giving a brief velocity command in the opposite direction of the motion of the robot.

Figure 5:
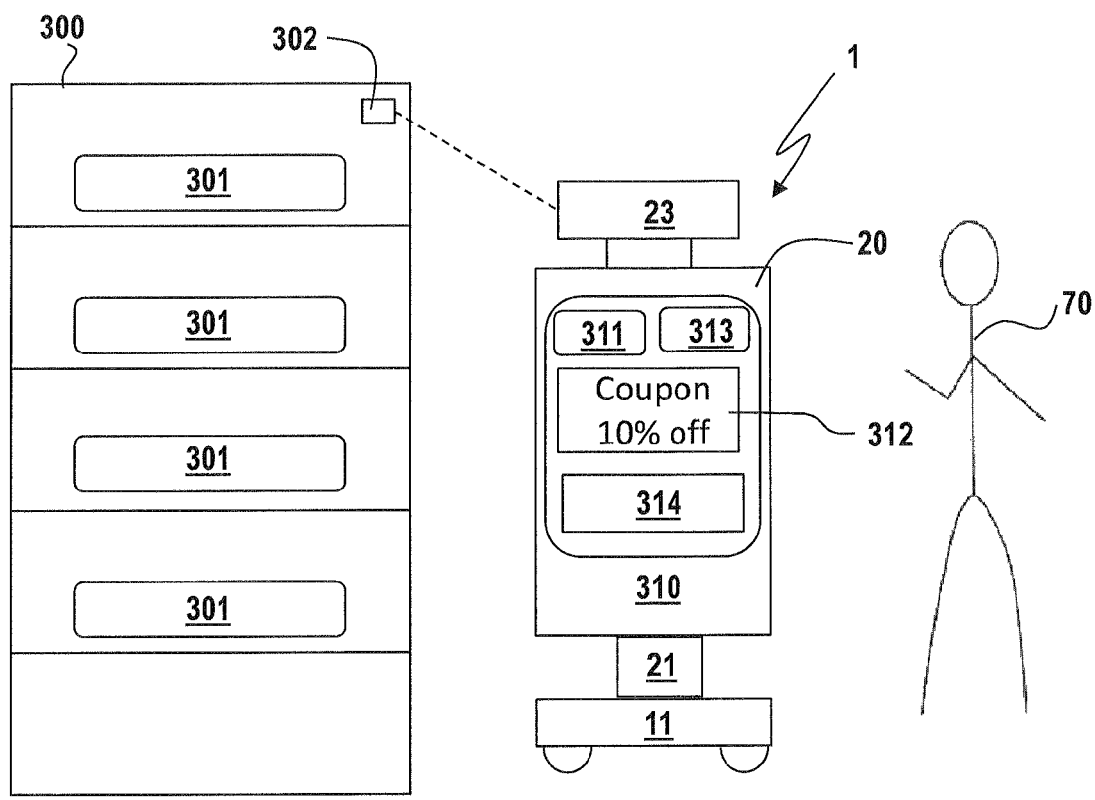
FIG. 5 is a schematic illustration of the robotic device interacting with items within a facility as well as a customer, in accordance with the first exemplary embodiment of the disclosure.

FIG. 5 is a schematic illustration of the robotic device 1 of FIG. 1 interacting with items within a facility as well as a customer, in accordance with the first exemplary embodiment of the disclosure. The facility in which the robot 1 operates may include a display structure 300, which can be any structure used for displaying a product or service in the facility. Common display structures may include shelves, tables, stands, or booths. The display structure 300 may include any number of items 301 on it, and may further include one or more of wireless transmitters 302, for the purpose of Automatic Identification and Data Capture.

Relative to FIGS. 1-2 and 5, when the robot 1 is guiding or accompanying a customer 70 and moves close to a display structure 300, it can recognize the structure 300 and the items 301 on it, through one or more of its 3D sensors, and display promotion information 310 relevant to the items 301 on the back display 20. The promotion information 310 on the back display 20 may include one or multiple images 311 of the items 301, text 313 about the items 301, promotion headings 312 about the items 301, and general information 314 about the structure 300. The general information 314 may include structure features, product category and subcategory, location, and so on. For example, if the structure 300 is a shelf or table in a retail store, when the robot 1 guides a customer through an aisle, the display 20 may show advertisements for the products on the shelves or tables along the aisle. When displaying advertisements for the products, the robot 1 may record the promotion status in the promotion database of the computing center 4, which may monitor and analyze how much promotion has been provided for each brand in the inventory. The robot 1 may also record the number of customers being guided to a certain display structure 300 in the promotion database of the computing center 4.

The robot 1 can act as a personal shopper for the customer 70, and provide personalized service and advice to the customer 70. The capability of the robot 1 to provide such personalized service may be powered by artificial engine software running on the computing center 4. For example, when the customer 70 is looking for a specific item, such as a dress, the robot 1 may observe the customer's hair color, eye color, face shape, height, body shape, etc. and make a suggestion on fashion. Fashion advice information, which may include associations between clothing, accessories or other such items and a person's physical or other characteristics may be stored in the computing center 4 and accessed by the robot 1 in order to make personalized fashion suggestions. For products that are too large or susceptible to shoplifting, the robot 1 can offer the customer 70 to pick up the product at the checkout point. The customer 70 may elect to pick up the product by telling the robot 1 by speech or may click a button for pick up on the touch-screen device. Once the customer 70 confirms that he/she would like to pick up the product at the check-out point, the robot 1 may print out a receipt for the customer 70 to bring to the check-out desk.

When the customer 70 is looking at the display structure 300, the robot 1 can monitor customer behavior, by tracking customer eye movements through the eye tracking device 29, and taking images through its 3D sensors. The robot 1 can send the data to the computing center 4, which may analyze the data and extract information about the customer 70, such as which product the customer is looking at, the customer's emotion seeing a product, the time the customer spends on a product, and so on.

When the robot 1 is operational within the facility, it may monitor the customer flow by taking pictures, through its 3D sensors, of the customers at a location over a period of time. For example, in a retail store, the robot 1 may take pictures of customers walking in and out of an aisle between 6 PM and 7 PM, and send these pictures to computing center 4, which can analyze the pictures and calculate how many people have gone through this aisle during this period of time. The computing center 4 may further analyze and integrate the customer flow data and make a map of customer movement throughout a facility, which may include the information like which section the customers spend most of their time, and which path the customers use most often.

The robot 1 can capture the characteristics of a customer by its sensors (such as microphone, 3D sensors, touch-screen, bio-metric sensors, etc.) and send the customer characteristics data to the computing center 4. The computing center 4 will process the characteristics data and find certain patterns of the particular customer 70, such as voice pattern, facial features, gesture pattern, bio-metric pattern, and the like, and save it in the customer database of computing center 4. When the customer 70 returns to the facility, the robot 1 can recognize the customer 70 as a return customer, for example, by accessing the information customer characteristics data stored in the customer database. When the robot 1 recognizes a return customer through the abovementioned process, it can show advertisements on touch-screen device 19 and back display 20, based on the current purchase interest and past shopping history of this customer. The robot can 'know' the return customer's purchase interest and shopping history by accessing the customer database 142.

The robot 1 may monitor the equipment in a facility and report any malfunction of equipment or need for cleanup or maintenance. For example, the robot 1 may monitor the refrigerators and freezers in a retail store, and send a report to the system backend if there is a malfunction of such equipment, or if there is an open door, or if there are spills or other cleanup needs. The robot 1 may further monitor the price of products in a facility, and send a report to the system backend if the displayed price of a product does not match the price in the digital inventory.

The customer 70 may request a human representative or operator 80 to log onto the robot 1 by speaking to it or by operating the touch-screen device 19. The robot 1 will access the operator network system 5, and request the operator network system to connect it to one of the available operators. The operator network system 5 can use a search engine 150 to find all the available operators, and use dialing software 151 to simultaneously dial to all the available operators. The first responding operator will be connected to the robot 1 and the connected operator 80 can use a support station 2 to log onto the robot 1. For example, if the customer 70 wants to talk to a painting expert, he/she can tell the robot "I would like to talk to a painting expert," or click a button for painting expert on the touch-screen device 19, and the robot 1 will access the operator network system 5 and connect to one of the available painting experts on the network. The connected painting expert then can use a computer or smartphone at the support station to log onto the robot 1.

The robot 1 may be capable of assisting with inventory on the display structure 300 of the facility by taking pictures of products on the display structure 300 with its 3D sensors, when it is operating near the structure 300. For example, when the robot 1 is moving along an aisle in a retail store, it can take pictures of products on the shelves along that aisle. The robot 1 may further take pictures of products in a basket, a shopping cart, and hands of a customer. The robot 1 can send all these pictures to the computing center 4, and the computing center 4 can process these pictures, recognize and differentiate the products, calculate how many products are left on the display structure 300, report the misplaced products that should not be placed on the structure 300, and update all this information in the inventory database. When there are misplaced products, or when the amount of a certain product is lower than a warning threshold pre-set in the inventory database, the robot 1 may send a warning message to the system backend software so that the facility manager or agent 81 can make arrangements to put away the misplaced products and/or refill the products on the structure 300.

In another example, the robot 1 can determine which items on the display structure 300 are out of stock, and which items are potentially low in stock, using a vision-based process. In this vision-based process, the camera system on the robot 1 is optimized for taking pictures at the correct level of focus and lighting. The vision-based data can be further augmented by the collection of RFID tag information, if there are any such deployed in the commercial facility, in order to reach even higher levels of accuracy. There may be advanced analytics running on both computer center 4 and the robot computer 14 to track, review and analyze the data. Additionally, the vision-based process may predict when inventory is likely to go out of stock in the future, providing indications of the optimal time to potentially order new stock in advance.

The vision-based process may include any number of steps and processes to assess inventory on the display structure 300. For example, during a specific time of day, such as in the early morning when the facility is unoccupied, the robot 1 may activate and travel through the facility. When the robot 1 passes each display structure 300, the robot 1, using its camera system and any of its 2D or 3D sensors, takes high-resolution images of every display structure 300, noting the XY position and its direction (angle) on a map that is generated for the facility. The images may be processed either on computer center 4 or on the robot computer 14 with advanced computer vision algorithms, identifying every product on the display structure 300 and identifying which items are out of stock. The stock information is transferred to inventory database 141.

The inventory database 141 may also ingest facility data from the facility's inventory system. The scanned data of the robot 1 may then be correlated with the facility's inventory system, identifying discrepancies ready for human attention. Then, using software 131, agent 81, which could be a staff member at the facility, can view the list of items in the facility needing attention and those not needing attention, and address each case as they work through their day. The software 131 can also let facility managers review employees' work, and any actions they may need to do, such as ordering additional product inventory. Software 131 can also let the Corporate/HQ staff oversee the situation at the facility, and view analytics of the inventory. Software 131 may further suggest or predict which items may go out of stock in the near future, and both the facility manager and corporate staff can address these suggestions or predictions.

Various techniques and processes may be used to improve accuracy of the image capturing abilities of the robot 1. For example, in an indoor retail space, image capture requirements are variable depending on several key factors, such as field-of-view and image size. These factors may be determined by robot 1 positioning within aisle-ways, and the physical size of the objects needing to be recognized. Accordingly, the placement of the cameras on the robot 1 platform may be determined by the image overlap requirements, such that there is sufficient overlap to compensate for changes in robot path due to obstacle avoidance. Overlapping images provide a safety margin, which may avoid issues caused by missing data points in a captured set.

Another technique used by the robot 1 is adjustment of camera parameters based on the environment of the facility. For example, with information derived from the navigation data, the robot 1 has the ability to automatically change the focal length of the captured image. This ability may be determined by knowing the aisle-way widths and the positioning of the robot 1 within the store. Auto-focus may be enabled in highly dynamic environments in which overall image clarity is a priority. In another example, the camera system of the robot 1 may be automatically configured to the correct lighting within the facility, such that high-resolution images may be properly focused on the products on the display structure 300 during inventory assessment. This adjustment of the camera parameters includes automatically enabling fill lighting to adjust image sensor sensitivity, which may provide clear and consistent imaging in areas of the retail space in which shadows or low light are present. Fill lighting is determined by overall lighting in the particular image capture area. The lighting may be adjustable in terms of intensity and diffusion, in order to better suit the environmental needs.

Further, the addition of fill lighting also allows for higher shutter speeds, such that the velocity of the platform can increase and thus reducing the time needed for inventory management process completion. To this end, the speed at which the image capture is taking place has a direct effect upon the required shutter speed and lighting. Higher platform speeds will reduce the time needed for image capture in a data set, but will require additional lighting to maintain the image quality and consistency. Lower platform speeds will increase the image capture time and reduce the amount of additional lighting required. The robot 1 may automatically adjust platform speed according to location requirements.

Figure 6:
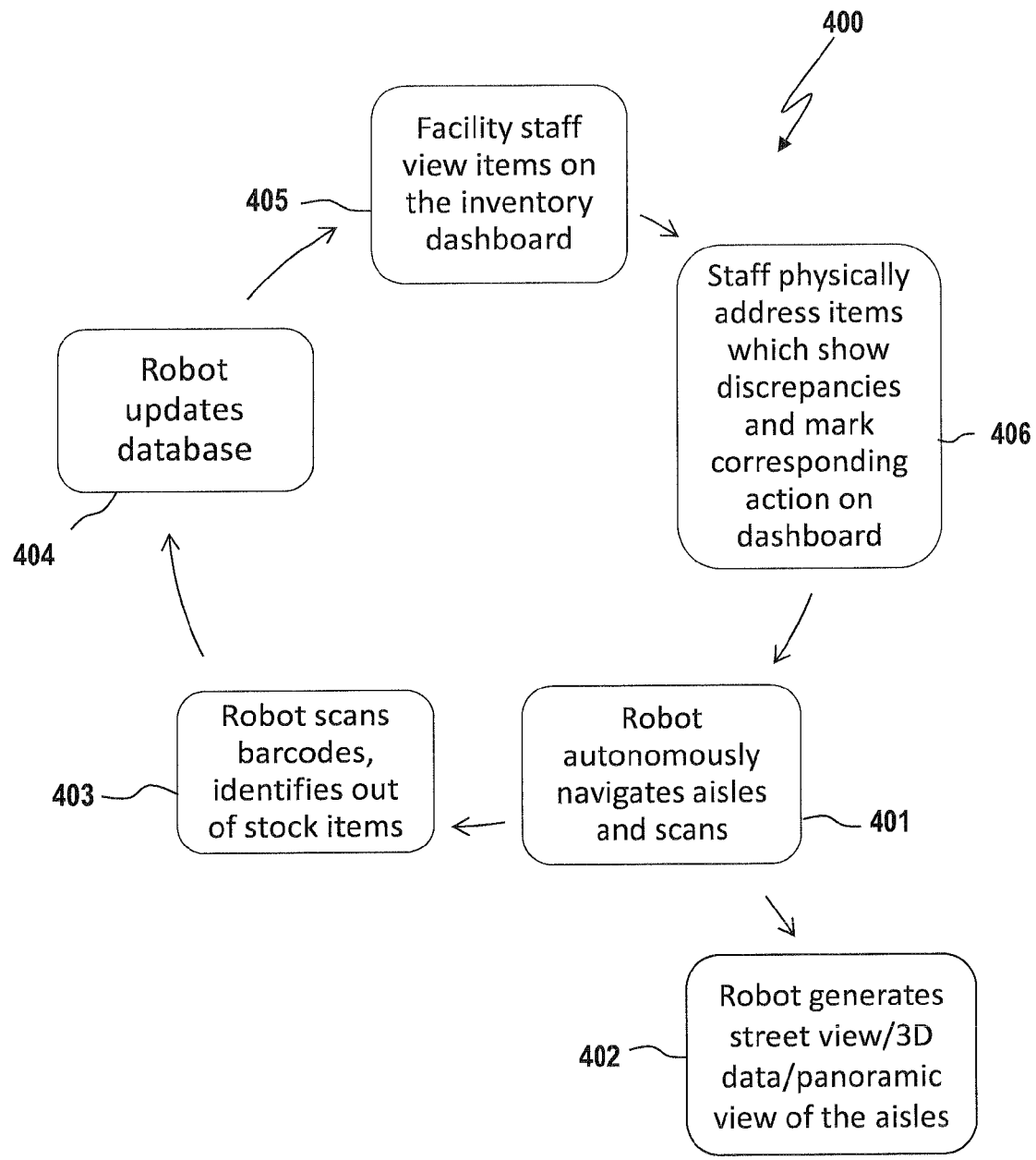
FIG. 6 is a block diagram of a visional algorithm used by the robotic device for providing customer service within a facility of FIG. 1, in accordance with the first exemplary embodiment of the disclosure.

FIG. 6 is a block diagram 400 of a visional algorithm used by the robotic device for providing customer service within a facility of FIG. 1, in accordance with the first exemplary embodiment of the disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

The vision algorithm used by the robot may use the images captured by the camera system and sensors to identify products on display structures within the facility. In one example of the vision algorithm, the robot autonomously navigates aisles and scans displays for products (block 401). Navigating aisles and scanning displays for products may include generating street view, 3D data, or panoramic views, of the aisle (block 402). The robot scans barcodes and products and identifies any out of stock items based on the absence of the items (block 403). Based on the data capture from the robot, the robot updates its internal databases or databases on external computing environments (block 404). The facility staff may then view items on the inventory dashboard on a computing device, either carried on the robot or external to the robot (block 405). Then, the facility staff may physically address items which show discrepancies and mark corresponding action on the dashboard of the robot (block 406).

The vision algorithm may be particularly useful in performing label extraction of products, barcode detection and extraction of products, determining if an item is out of stock or in stock, and with providing a street view of an indoor environment. Relative to label extraction, the robot may utilize color thresholding and contour detection to determine the location of the labels of products containing the label information. The extracted labels are then used for barcode detection. Barcode detection may utilize a gradient magnitude of the image (label) in horizontal and vertical directions which can be determined using Scharr operator. The region with high horizontal gradients and low vertical gradients may be identified. High frequency noise may be smoothed from the gradient image. Blurred images, may be subject to thresholding and morphological operators are applied on the thresholded image. Using contour detection, the barcode region from a label is extracted, which permits identification of the item information, a price, a location of the item, and a window size for searching for the item in an image.

To determine which items are in-stock or out-of-stock, i.e., an availability of an item on the display structure, a morphological operator may be applied to the structure background. Commonly, aisles in retail stores are classified into three different categories: pegs, shelves, and trays. Considering peg items, for example, if an item is out-of-stock it is possible to detect circles in the aisle backing. The circle density in a predefined window-size helps in determining which item is out-of-stock. For the sake of reducing the search area, window size may be encoded in barcodes on the aisles. First, a region containing barcode labels, which provide a description of the item, location (aisle and item), price and window size may be extracted using different morphological operators. Around the label, the circle density within the described window-size may then be determined. If the circle density is high, it can be determined that the item is out-of-stock.

It is noted that the processes described herein may be used with multiple images compiled together, so-called 'image stitching.' Image stitching may be implemented to account for the regions of an image that are close to the borders of the image. Relative to the indoor street view, it is noted that the images and information on the availability of items may be available after scanning and processing. Using image stitching, an indoor version of the street-view, e.g., consecutive images stitched together to form a continuous image of the aisle in the facility, may also be generated from the data and available to view. It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. For example, the robot may assess the reliability of its sensor data, including navigation and vision, as well as its interpretation of that data. When the robot determines that it is uncertain about a situation, for example, based on the values in a covariance matrix, it may modify its behavior to maintain its own safety as well as those around it. The robot also may decide to ask for help when it is uncertain. For example, if the robot is unable to determine if a particular item is out of stock, the robot may send or store a photo of that spot for a human to interpret. Similarly, if the robot gets stuck while locomoting about the store, either physically stuck or simply lost, the robot may call for a human to take over via telepresence to get it unstuck and on its way.

All such modifications and variations are intended to be included herein within the scope of the present disclosure and protected by the following claims.

What is claimed is:

1. A robot for providing customer service within a facility, comprising:
   a locomotion platform;
   an upper sensor for detecting objects within an upper field of view of the robot;
   a lower sensor for detecting objects within a lower field of view of the robot;
   a display; and
   a robot computer in communication with the locomotion platform, the upper sensor and the lower sensor, the computer having a processor and computer-readable memory, wherein the robot computer is configured to:
      detect the presence of a customer within the facility based on information received from at least one of the upper sensor and lower sensor;
      access at least one database storing information associated with at least one product available to the customer within the facility and to provide customer service to the customer based on the accessed information; and
      guide a customer to products within the facility which the customer wishes to locate by causing the robot to navigate to those products, wherein the robot navigates to the products along a path optimized based on path efficiency and location of products under promotion.

2. The robot of claim 1, wherein the robot computer is further configured to receive commands from an operator at a remotely-located support station and to operate based on the received commands.

3. The robot of claim 2, wherein the robot computer is further configured to provide customer service by facilitating a two-way communication between a customer interacting with the robot in the facility and an operator at a remotely-located support station.

4. The robot of claim 1, wherein the at least one database stores information relating to at least one of: promotional videos, product images, product descriptions; promotion priority information; promotion benefits; promotion history; brand relationships; product inventory; and location of products within the facility.

5. The robot of claim 1, wherein the robot computer is further configured to access a customer database storing information associated with customers in the facility.

6. The robot of claim 5, wherein the information associated with customers in the facility includes at least one of: purchase history information; loyalty card information; robot interaction history; and customer behavior pattern analysis.

7. The robot of claim 1, further comprising a robot location detector for detecting the robot's location, and wherein the robot computer is further configured to generate a map of the facility based on information received from said upper sensor, lower sensor and robot location detector.

8. The robot of claim 1, wherein the robot computer is further configured to locate a product in the facility when a customer presents the product to the upper sensor, based on a comparison of the information about the product detected by the upper sensor and product information stored in the at least one database.

9. The robot of claim 1, wherein the robot computer is further configured to attract customer attention upon detecting the presence of a customer by performing at least one of: causing the robot to move; displaying graphics on the display for attracting attention; and providing audio signals to a robot speaker for attracting attention.

10. The robot of claim 1, wherein the robot computer is further configured to determine a customer's level of interest and need for assistance based on sensed parameters relating to the customer's state-of-mind.

11. The robot of claim 10, wherein the robot is configured to navigate away from customers determined not to be interested in receiving assistance, and to navigate to customers determined to be interested in receiving assistance and to offer assistance to the interested customers.

12. The robot of claim 10, further comprising a microphone, wherein the robot computer is further configured to receive spoken information from a customer detected by the microphone and to process the spoken information using a speech engine, and to provide customer service based on the received spoken information.

13. The robot of claim 1, wherein the robot computer is further configured to display similar products which are within the facility if the product the customer wishes to locate is not available within the facility.

14. The robot of claim 1, further characterized by one or more of the following features:

(a) wherein the robot is configured to assess reliability of its sensor data, including navigation and vision, and its interpretation of that data;

(b) wherein the robot is able to modify its behavior in order to maintain its own safety as well as the safety of those around it; and (c) wherein the robot asks for help if it is unable to determine if a particular item is out of stock or if it becomes stuck or lost while locomoting.

15. The robot of claim 1, wherein the robot computer is further configured to provide personalized advice to the customer based on information detected about the customer.

16. The robot of claim 1, wherein the robot computer is further configured to monitor customer behavior based on information detected about the customer.

17. The robot of claim 1, wherein the robot is configured to capture images of customers within the facility, for analyzing customer behavior.

18. The robot of claim 1, wherein the robot is configured to capture images of products within the facility, for inventory processing.

19. The robot of claim 1, wherein the robot is configured to determine whether a customer within the facility is a return customer, and to provide personalized customer service to a return customer based on past sensed information associated with the return customer in the facility.

20. A robotic system for providing customer service within a facility, comprising:
a robot having a locomotion platform, an upper sensor for detecting objects within an upper field of view of the robot, a lower sensor for detecting objects within a lower field of view of the robot, a display, and a robot computer in communication with the locomotion platform, the upper sensor and the lower sensor, the computer having a processor and computer-readable memory; and
a support station located remote to the robot, the support station having a support station camera, a support station display, and a support station computer in communication with the support station camera and support station display, the support station computer having a processor and computer-readable memory;
wherein the robot is configured to provide customer service by facilitating a two-way communication between a customer interacting with the robot in the facility and an operator at the remotely-located support station, and the robot is further configured to guide a customer to products within the facility which the customer wishes to locate by causing the robot to navigate to those products, wherein the robot navigates to the products along a path optimized based on path efficiency and location of products under promotion.

21. The system of claim 20, wherein the robot computer is configured to receive commands from the operator at the support station and to operate the robot based on the received commands.

22. A method of providing customer service with a robot, the method comprising:
providing a robot within a facility with at least one customer, wherein the robot has a locomotion platform, an upper sensor for detecting objects within an upper field of view of the robot, a lower sensor for detecting objects within a lower field of view of the robot, a display, and a robot computer in communication with the locomotion platform, the upper sensor and the lower sensor;

detecting a presence of the at least one customer within the facility based on information received from at least one of the upper sensor and lower sensor; and providing customer service to the at least one customer, wherein the robot is configured to guide a customer to products within the facility which the customer wishes to locate by causing the robot to navigate to those products, wherein the robot navigates to the products along a path optimized based on path efficiency and location of products under promotion.

23. The method of claim 22, further comprising accessing at least one database storing information associated with at least one product available to the customer within the facility.

24. The method of claim 22, further comprising facilitating a two-way communication between the at least one customer and an operator at a remotely-located support station with the robot in the facility.

* * * * *